(12) United States Patent
Awaji et al.

(10) Patent No.: US 8,934,739 B2
(45) Date of Patent: Jan. 13, 2015

(54) SENSOR HEAD AND OPTICAL SENSOR

(75) Inventors: Daisuke Awaji, Sakura (JP); Akira Sakamoto, Sakura (JP)

(73) Assignee: Fujikura Ltd., Tokyo (JP)

( * ) Notice: Subject to any disclaimer, the term of this patent is extended or adjusted under 35 U.S.C. 154(b) by 141 days.

(21) Appl. No.: 13/198,268

(22) Filed: Aug. 4, 2011

(65) Prior Publication Data

US 2012/0033205 A1    Feb. 9, 2012

(30) Foreign Application Priority Data

Aug. 6, 2010    (JP) .................................. 2010-177932

(51) Int. Cl.
| | | |
|---|---|---|
| *G02B 6/00* | (2006.01) | |
| *G01L 9/00* | (2006.01) | |
| *G01L 11/02* | (2006.01) | |

(52) U.S. Cl.
CPC ............. *G01L 9/0077* (2013.01); *G01L 11/025* (2013.01)
USPC .......................................................... 385/12

(58) Field of Classification Search
CPC ...................................................... G01D 5/353
USPC ..................................... 385/2, 133
See application file for complete search history.

(56) References Cited

U.S. PATENT DOCUMENTS

| | | | | |
|---|---|---|---|---|
| 5,200,615 A | * | 4/1993 | Hopenfeld | ..................... 250/302 |
| 5,879,943 A | | 3/1999 | Ando et al. | |
| 6,052,179 A | * | 4/2000 | Prohaska et al. | ............. 356/73.1 |

| | | |
|---|---|---|
| 2006/0145066 A1 | 7/2006 | Tamiya |
| 2006/0250900 A1 | 11/2006 | Tamiya |
| 2006/0279747 A1 | 12/2006 | Tamiya |
| 2009/0001258 A1 | 1/2009 | Horimoto et al. |
| 2009/0257705 A1 | 10/2009 | Horimoto et al. |

FOREIGN PATENT DOCUMENTS

| | | | |
|---|---|---|---|
| JP | 63-096507 A | | 4/1988 |
| JP | 63-169521 A | | 7/1988 |
| JP | 2-049115 A | | 2/1990 |
| JP | 2-057909 A | | 2/1990 |
| JP | 02216030 A | * | 8/1990 |
| JP | 3-243822 A | | 10/1991 |
| JP | 6-008724 B2 | | 2/1994 |

(Continued)

OTHER PUBLICATIONS

Notice of Allowance issued by Japanese Patent Office in Japanese Application No. 2010-177932 dated Oct. 29, 2013.

*Primary Examiner* — Ryan Lepisto
*Assistant Examiner* — Erin Chiem
(74) *Attorney, Agent, or Firm* — Sughrue Mion, PLLC

(57) ABSTRACT

A sensor head for an optical pressure sensor according to the present invention includes: a light-emitting optical fiber for transmitting light emitted from a light source; a reflecting plate whose position relative to an end surface of the light-emitting optical fiber moves in accordance with a pressure and which reflects the light emitted from the end surface of the light-emitting optical fiber; a first optical fiber and a second optical fiber, each of which has an end surface that the light reflected by the reflecting plate enters, the first optical fiber transmitting the light thus entered to a first photodetector and the second optical fiber transmitting the light thus entered to a second photodetector; and a light-intensity variation section that changes a transmission loss in the light-emitting optical fiber in accordance with a change in humidity in the sensor head.

18 Claims, 8 Drawing Sheets

(56) References Cited

FOREIGN PATENT DOCUMENTS

| | | | |
|---|---|---|---|
| JP | 6-307858 A | 11/1994 |
| JP | 08-086752 A | 4/1996 |
| JP | 08-219916 A | 8/1996 |
| JP | 08-233726 A | 9/1996 |
| JP | 11-352158 A | 12/1999 |
| JP | 2001-083031 A | 3/2001 |
| JP | 2003-329417 A | 11/2003 |
| JP | 2004-301769 A | 10/2004 |
| JP | 2006-038559 A | 2/2006 |
| JP | 2006-194855 A | 7/2006 |
| JP | 2006-275654 A | 10/2006 |
| JP | 2007-024826 A | 2/2007 |
| JP | 2008-298581 A | 12/2008 |
| JP | 2009-053022 A | 3/2009 |
| JP | 2009-294111 A | 12/2009 |
| JP | 2010-133862 A | 6/2010 |

\* cited by examiner

SENSOR HEAD AND OPTICAL SENSOR

This Nonprovisional application claims priority under 35 U.S.C. §119(a) on Patent Application No. 2010-177932 filed in Japan on Aug. 6, 2010, the entire contents of which are hereby incorporated by reference.

TECHNICAL FIELD

The present invention relates to an optical sensor and a sensor head for use in the optical sensor.

BACKGROUND ART

Conventionally, electrical sensors have been generally known as a sensor for measuring physical quantities of an object such as movement and temperature of the object, and pressure applying to or applied by the object. The electrical sensor transmits, to a processing section, an electrical signal generated in a measuring section (sensor head) in accordance with a physical quantity. Then, the transmitted electrical signal is converted into the physical quantity in the processing section. When a distance between the measuring section and the processing section is large, the electrical signal is susceptible to an electromagnetic noise, whereby measurement accuracy of the electrical sensor is deteriorated. Further, the electrical sensor requires supplying power to the measuring section located in a distance, therefore is unsuitable for measuring, for example, a water level (water pressure) of a dam, a water level (water pressure) of a subsoil drainage pipe, or a water level (pressure) of combustible liquefied natural gas in a storage tank, for example.

In contrast, in an optical sensor including an optical fiber, a measuring section is supplied with light through the optical fiber. Instead of the electrical signal, an optical signal in accordance with a physical quantity is transmitted to a processing section from the measuring section through the optical fiber. Therefore, the optical sensor is capable of transmitting a signal from the measuring section without influence of the electromagnetic noise, and the measurement can be performed with high accuracy (for example, see Patent Literatures 1 to 10).

FIG. 10 is a schematic view illustrating a configuration of a conventional optical pressure sensor as described in Patent Literature 10 and the like. An optical pressure sensor 101 includes a sensor head 102, an optical device 103, and a calculation section 104. The optical device 103 includes a light source 105, a first photodetector 106, a second photodetector 107, a first amplifier 108, and a second amplifier 109.

The sensor head 102 includes a light-emitting optical fiber 110 for transmitting light emitted from the light source 105 to the sensor head 102, and a light-receiving first optical fiber 111 and a light-receiving second optical fiber 112 that transmit the light to the optical device 103 from the sensor head 102. The light-emitting optical fiber 110, the light-receiving first optical fiber 111, and the light-receiving second optical fiber 112 are held by an optical-fiber holding section 113 in the sensor head 102. The sensor head 102 includes a diaphragm 114 that is formed from a thin metal plate and located at a position facing to an end surface of the light-emitting optical fiber 110. The diaphragm 114 includes a reflecting plate 115 located on a surface facing to the end surface of the light-emitting optical fiber 110. The diaphragm 114 is deformed by a pressure applying to an outside thereof, and the position of the reflecting plate 115 is accordingly moved.

In the example illustrated in FIG. 10, the sensor head 102 is provided under water, and the optical pressure sensor 101 measures a pressure (water pressure) applying to the diaphragm 114 so that information of a water level can be obtained. The light emitted from the light source 105 is transmitted to the sensor head 102 through the light-emitting optical fiber 110, then the transmitted light is emitted from the end surface of the light-emitting optical fiber 110. Thereafter, the light reflects on a reflecting surface of the reflecting plate 115, and enters end surfaces of the light-receiving first optical fiber 111 and the light-receiving second optical fiber 112. The light entered the end surface of the light-receiving first optical fiber 111 is transmitted to the first photodetector 106 through the light-receiving first optical fiber 111, and the light entered the end surface of the light-receiving second optical fiber 112 is transmitted to the second photodetector 107 through the light-receiving second optical fiber 112.

FIG. 11 is an enlarged sectional view of a main part of the sensor head. The diaphragm is not shown in FIG. 11. The light-receiving first optical fiber 111 and the light-receiving second optical fiber 112 are provided so as to be parallel to each other. The light-emitting optical fiber 110 and the light-receiving first optical fiber 111, and the light-emitting optical fiber 110 and the light-receiving second optical fiber 112 are each tilted so as to be symmetric with respect to a normal line of the reflecting surface of the reflecting plate 115 (specifically, so that each of angles $\theta$ with respect to the normal lines of the reflecting surfaces is 5°). The end surfaces of the light-emitting optical fiber 110, the light-receiving first optical fiber 111, and the light-receiving second optical fiber 112 face to the reflecting surface of the reflecting plate 115.

The light emitted from the end surface of the light-emitting optical fiber 110 progresses while expanding radially with an optical axis in the center, then reflects on the reflecting surface of the reflecting plate 115, to thereby enter into the light-receiving first optical fiber 111 and the light-receiving second optical fiber 112 through the respective end surfaces thereof. Meanwhile, the position of the optical axis of the light thus reflected changes in accordance with the position of the reflecting plate 115. Because of this, an intensity of the light entering the light-receiving first optical fiber 111 and an intensity of the light entering the light-receiving second optical fiber 112 change in accordance with the position of the reflecting plate 115.

The first photodetector 106 (see FIG. 10) receives the light thus transmitted, and generate an electrical signal corresponding to the light thus received. Meanwhile, the second photodetector 107 receives the light thus transmitted, and generate an electrical signal corresponding to the light thus received. The electrical signals generated in the first photodetector 106 and the second photodetector 107 are supplied to the first amplifier 108 and the second amplifier 109, respectively.

The first amplifier 108 and the second amplifier 109 each amplify the electrical signals that they respectively received. Then, the first amplifier 108 and the second amplifier 109 each send, to the calculation section 104, the electrical signals thus amplified.

Putting that the intensity of the light received by the first photodetector 106 (in other words, the light intensity indicated by the electrical signal supplied by the first amplifier 108) is P1, the intensity of the light received by the second photodetector 107 (in other words, light intensity indicated by the electrical signal supplied by the second amplifier 109) is P2, and a light intensity ratio calculated in the calculation section 104 based on the light intensities P1 and P2 is F value, the F value is obtained by calculating the following equation: $F(P1, P2)=(P1-P2)/(P1+P2)$. The F value thus obtained is compared with, for example, a table calibrated in advance. In this way, a pressure and a depth of water at the position of the diaphragm 114 can be obtained.

CITATION LIST

Patent Literature

Patent Literature 1
Japanese Patent Publication, Tokukouhei, No. 06-008724 A (Publication Date: Feb. 2, 1994)
Patent Literature 2
Japanese Patent Application Publication, Tokukaihei, No. 02-057909 A (Publication Date: Feb. 27, 1990)
Patent Literature 3
Japanese Patent Application Publication, Tokukaihei, No. 03-243822 A (Publication Date: Oct. 30, 1991)
Patent Literature 4
Japanese Patent Application Publication, Tokukaihei, No. 02-049115 A (Publication Date: Feb. 19, 1990)
Patent Literature 5
Japanese Patent Application Publication, Tokukaishow, No. 63-169521 A (Publication Date: Jul. 13, 1988)
Patent Literature 6
Japanese Patent Application Publication, Tokukaihei, No. 11-352158 A (Publication Date: Dec. 24, 1999)
Patent Literature 7
Japanese Patent Application Publication, Tokukai, No. 2004-301769 A (Publication Date: Oct. 28, 2004)
Patent Literature 8
Japanese Patent Application Publication, Tokukaihei, No. 06-307858 A (Publication Date: Nov. 4, 1994)
Patent Literature 9
Japanese Patent Application Publication, Tokukai, No. 2008-298581 A (Publication Date: Dec. 11, 2008)
Patent Literature 10
Japanese Patent Application Publication, Tokukai, No. 2007-024826 A (Publication Date: Feb. 1, 2007)

SUMMARY OF INVENTION

Technical Problems

However, when the optical pressure sensor 101 is used as a water level sensor, water (moisture) would permeate into the sensor head 102 gradually. The permeated water sometimes causes malfunction of the optical pressure sensor 101. For example, the water permeated into the sensor head 102 affects holding of a member inside the sensor head 102, thereby changing the position of the member or the optical fiber inside the sensor head 102. This deteriorates measurement accuracy of the optical pressure sensor 101. Sealing of the sensor head 102 is apt to weaken at parts from where the optical fibers 110, 111, and 112 (or an optical fiber cable bundling the optical fibers 110, 111, and 112) come out of the sensor head 102. Therefore it is difficult to prevent permeating water completely. (see FIG. 10)

By way of precaution against an abnormality such as permeation of water inside the sensor head, a humidity sensor for detecting humidity may be built in the sensor head. Providing the humidity sensor in the sensor head increases the number of parts to be used, thereby making the optical pressure sensor costly. Moreover, when the humidity sensor needs an electrical wiring in the sensor head, the advantage of the optical pressure sensor, that is, no need to supply power to the sensor head, is sacrificed. Furthermore, if a cheap humidity sensor is used, it is necessary to pull the sensor head up from water and take the humidity sensor out of the sensor head in order to check a measured humidity, therefore operating time and operational expense for checking the measured humidity are required.

In recent years, flood damage and the like happen frequently because of a sudden thunderstorm (torrential rain), therefore a sensor capable of stably measuring a water level and the like is demanded. When an abnormality happened in the sensor head (permeation of water, increase in humidity, fluctuation of temperature, permeation of gas, permeation of oil, or the like) can be detected in its earlier stages, the sensor can be fixed or replaced before the sensor malfunctions, so that stable measurement can be performed.

The present invention has been made in view of the above-mentioned problems, and an object of the present invention is to realize an optical sensor capable of detecting an abnormality of environmental condition happened in the sensor head.

Solution to Problems

A sensor head according to the present invention is a sensor head for an optical sensor for measuring a physical quantity including: a first optical fiber for transmitting light emitted from a light source; a reflector whose position relative to an end surface of the first optical fiber moves in accordance with the physical quantity and which reflects the light emitted from the end surface of the first optical fiber; and a second optical fiber and a third optical fiber, each of which has an end surface that the light reflected by the reflecting plate enters, the second optical fiber transmitting the light thus entered to a second photodetector and the third optical fiber transmitting the light thus entered to a third photodetector, and in order to attain the object, the sensor head for the optical sensor includes a light-intensity variation section that changes a transmission loss in the first optical fiber in accordance with a change in environmental condition in the sensor head.

According to this configuration, the transmission loss in the first optical fiber changes in accordance with a change in the environmental condition in the sensor head, and intensities of the light entering the second optical fiber and the third optical fiber change on the same level. Therefore, the physical quantity can be obtained by the optical sensor including the above-mentioned sensor head based on a ratio of the intensities of the light transmitted through the second optical fiber and the third optical fiber, and also can detect the change in the environmental condition in the sensor head from the intensities of the light transmitted through the second optical fiber and the third optical fiber. Thus, a user can find an abnormality of the environmental condition before the physical quantity cannot be obtained because of malfunction of the sensor head. Hence, there can be prevented a situation in which the sensor head suddenly malfunctions and cannot be for use in measuring the physical quantity.

Advantageous Effects of Invention

A sensor head and an optical sensor according to the present invention can find a physical quantity from a ratio of light intensities transmitted through a second optical fiber and a third optical fiber, and also detect a change in environmental condition in the sensor head from the light intensities transmitted through the second optical fiber and the third optical fiber. Thus, a user can find an abnormality of the environmental condition in the sensor head before the physical quantity cannot be obtained because of malfunction of the sensor head.

DESCRIPTION OF EMBODIMENTS

Hereinafter, embodiments of the present invention will be described in detail with reference to the drawings. An optical pressure sensor for measuring pressure will be described as an example of an optical sensor.

Embodiment 1

(Structure of Optical Pressure Sensor)

Figure 1:
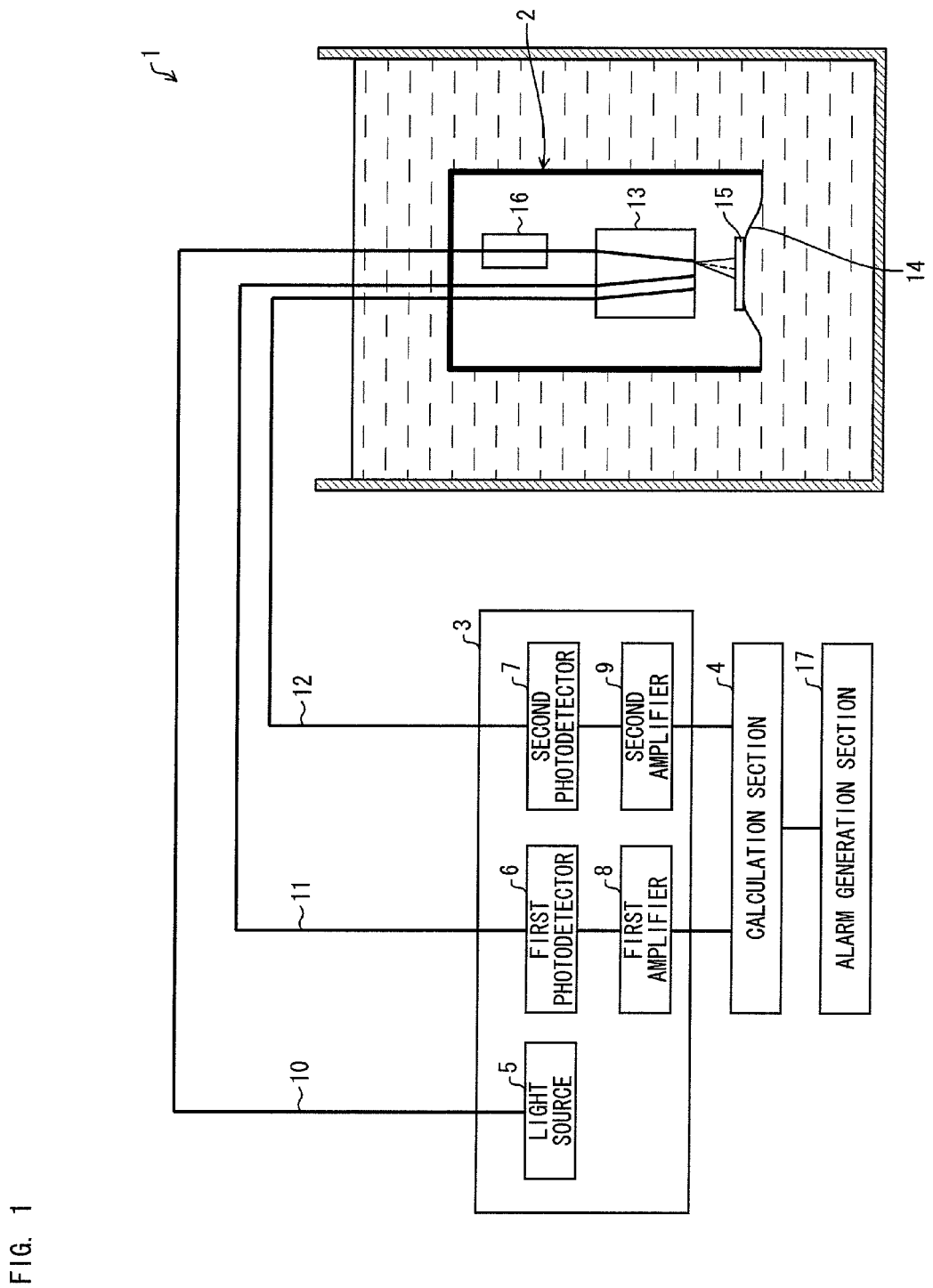
FIG. 1 is a schematic view illustrating configuration of an optical pressure sensor according to Embodiment 1 of the present invention.

FIG. 1 is a schematic view illustrating configuration of an optical pressure sensor according to this embodiment. An optical pressure sensor (optical sensor) 1 includes a sensor head 2, an optical device 3, a calculation section (processing section) 4, and an alarm generation section 17. The optical device 3 includes a light source 5, a first photodetector 6, a second photodetector 7, a first amplifier 8, and a second amplifier 9.

The sensor head 2 has a housing having space inside, and includes a light-emitting optical fiber 10 for transmitting light emitted from the light source 5 to the sensor head 2, and a light-receiving first optical fiber 11 and a light-receiving second optical fiber 12 for transmitting the light to the optical device 3 from the sensor head 2. The light-emitting optical fiber 10, the light-receiving first optical fiber 11, and the light-receiving second optical fiber 12 are held by an optical-fiber holding section 13 in the sensor head 2. The sensor head 2 includes a diaphragm 14 that is formed from a thin metal plate and located at a position facing to an end surface of the light-emitting optical fiber 10 inside the sensor head 2. The diaphragm 14 includes a reflecting plate (reflector) 15 located at a surface facing to the end surface of the light-emitting optical fiber 10. The diaphragm 14 is deformed by a pressure applied to an outside thereof, and the position of the reflecting plate 15 relative to the end surface of the light-emitting optical fiber 10 is accordingly moved. Moreover, the sensor head 2 includes a loss variation section (light-intensity variation section) 16 provided in the periphery of the light-emitting optical fiber 10. The light-emitting optical fiber 10 is provided so as to pass through the loss variation section 16.

In the example illustrated in FIG. 1, the sensor head 2 is provided under water, and the optical pressure sensor 1 measures a pressure applied to the diaphragm 14 so that information of a depth of water or a water level can be obtained. The light emitted from the light source 5 is transmitted to the sensor head 2 through the light-emitting optical fiber 10, to thereby pass through the loss variation section 16. The loss variation section 16 has a function of changing a transmission loss in the light-emitting optical fiber 10 in accordance with environmental condition such as humidity or temperature. Detailed configuration of the loss variation section 16 will be described below. After passing through the loss variation section 16, the light in the light-emitting optical fiber 10 is emitted from the end surface of the light-emitting optical fiber 10 facing to the reflecting plate 15. Then, the light reflects on a reflecting surface of the reflecting plate 15, and enters through respective end surfaces of the light-receiving first optical fiber 11 and the light-receiving second optical fiber 12. The light entered through the end surface of the light-receiving first optical fiber 11 is transmitted to the first photodetector 6 by the light-receiving first optical fiber 11, whereas the light entered through the end surface of the light-receiving second optical fiber 12 is transmitted to the second photodetector 7 by the light-receiving second optical fiber 12.

Figure 2:
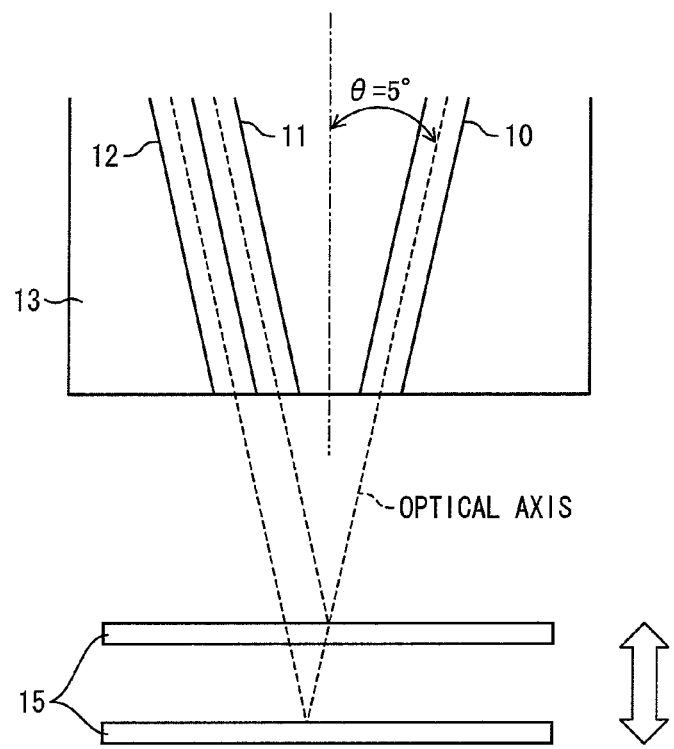
FIG. 2 is an enlarged sectional view illustrating a main part of the sensor head of FIG. 1.

FIG. 2 is an enlarged sectional view illustrating a main part of the sensor head of FIG. 1. The diaphragm is not shown in FIG. 2. The light-receiving first optical fiber 11 and the light-receiving second optical fiber 12 are provided so as to be parallel to each other. The light-emitting optical fiber 10 and the light-receiving first optical fiber 11, and the light-emitting optical fiber 10 and the light-receiving second optical fiber 12 are each tilted so as to be symmetric with respect to a normal line of the reflecting surface of the reflecting plate 15, more specifically, so that each of angles with respect to the normal line of the reflecting surface is a predetermined angle θ. Herein, each of the angles θ is set to 5°. The end surfaces of the light-emitting optical fiber 10, the light-receiving first optical fiber 11, and the light-receiving second optical fiber 12 face to the reflecting surface of the reflecting plate 15.

The light emitted from the end surface of the light-emitting optical fiber 10 progresses while expanding radially with an optical axis in the center, then reflects on the reflecting surface of the reflecting plate 15, to thereby enter the light-receiving first optical fiber 11 and the light-receiving second optical fiber 12 through the end surfaces thereof. Meanwhile, the position of the optical axis of the light thus reflected and an optical path length from the end surface of the light-emitting optical fiber 10 to the end surface of the light-receiving first optical fiber 11 or the light-receiving second optical fiber 12 change in accordance with the position of the reflecting plate 15. Therefore, an intensity of the light entering the light-receiving first optical fiber 11 and an intensity of the light entering the light-receiving second optical fiber 12 change in accordance with the position of the reflecting plate 15. Specifically, when a distance between the end surface of the light-emitting optical fiber 10 and the reflecting plate 15 is small (in other words, when a pressure applying to the outside of the diaphragm is high), the intensity of the light entering the light-receiving first optical fiber 11 is high. Meanwhile, when a distance between the end surface of the light-emitting optical fiber 10 and the reflecting plate 15 is large (in other words, when the pressure applying to the outside of the diaphragm is low), the intensity of the light entering the light-receiving second optical fiber 12 is high.

The first photodetector 6 (see FIG. 1) receives the light transmitted through the light-receiving first optical fiber 11, then generates an electrical signal corresponding to the intensity of the light thus received (light thus received is converted into an electrical signal). Meanwhile, the second photodetector 7 receives the light transmitted through the light-receiving second optical fiber 12, then generates an electrical signal corresponding to the intensity of the light thus received (light thus received is converted into an electrical signal). The electrical signals generated in the first photodetector 6 and the second photodetector 7 are supplied to the first amplifier 8 and the second amplifier 9, respectively.

The first amplifier 8 and the second amplifier 9 each amplify the electrical signals that they received. Then, the first amplifier 8 and the second amplifier 9 each send, to the calculation section 4, the electrical signals thus amplified. Based on the respective electrical signals, the calculation section 4 finds a physical quantity such as a pressure. The calculation section 4 includes data storage means. The data storage means stores in advance (i) a table of correspondence between the electrical signals and the physical quantities and (ii) a threshold data described below.

(Configuration of Loss Variation Section)

Figure 3:
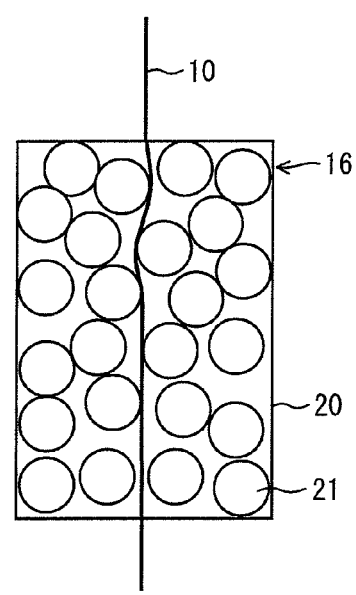
FIG. 3 is a sectional view illustrating a configuration example of a loss variation section of FIG. 1.

FIG. 3 is a sectional view illustrating a configuration example of the loss variation section 16 of FIG. 1. The loss variation section 16 includes a rectangular housing 20 and spherical water-absorbable resins 21 stuffed into the housing 20. The light-emitting optical fiber 10 passes from one end to the other end of the housing 20 through gaps of the water-absorbable resins 21, that is, passes through inside the loss variation section 16. Further, the housing 20 is configured to be permeable for water (moisture).

When water permeates into the sensor head 2 (see FIG. 1), the water-absorbable resins 21 absorb water inside the sensor head 2 and then swell. The light-emitting optical fiber 10 has such a tension that the light-emitting optical fiber 10 is pushed and bent by swelling of the water-absorbable resins 21. The swelled water-absorbable resins 21 press the light-emitting optical fiber 10 passing through inside the loss variation section 16, and change the curvature of the light-emitting optical fiber 10 locally by bending the light-emitting optical fiber 10, or locally apply a lateral pressure to the light-emitting optical fiber 10. Transmission losses in optical fibers is increased by increase in curvature (decrease in a radius of the curvature) thereof, applying a lateral pressure thereto, applying a tensile strength thereto, or the like. When water permeates into the sensor head 2, the water-absorbable resins 21 swell in accordance with the amount of the water, then the transmission loss in the light-emitting optical fiber 10 increases. Thus, the intensity of the light emitted from the light-emitting optical fiber 10 changes in accordance with the amount of the water permeating into the sensor head 2. When a humidity in the sensor head 2 rises, the intensity of the light emitted from the light-emitting optical fiber 10 decreases. For example, a well-known water-absorbable polymer and the like can be used as the water-absorbable resins 21.

(Measurement of Pressure and Detection of Abnormality)

Herein, putting that the intensity of the light received by the first photodetector 6 (in other words, the light intensity indicated by the electrical signal supplied by the first amplifier 8) is P1, the intensity of the light received by the second photodetector 7 (in other words, the light intensity indicated by the electrical signal supplied by the second amplifier 9) is P2, and the light intensity ratio calculated in the calculation section 4 with use of the light intensities P1 and P2 is F value, the F value is obtained by calculating the following equation: $F(P1, P2)=(P1-P2)/(P1+P2)$. The F value thus obtained is compared with the table calibrated in advance or the like, therefore the pressure and the depth of water at the position of the diaphragm 14 can be found out.

Figure 4:
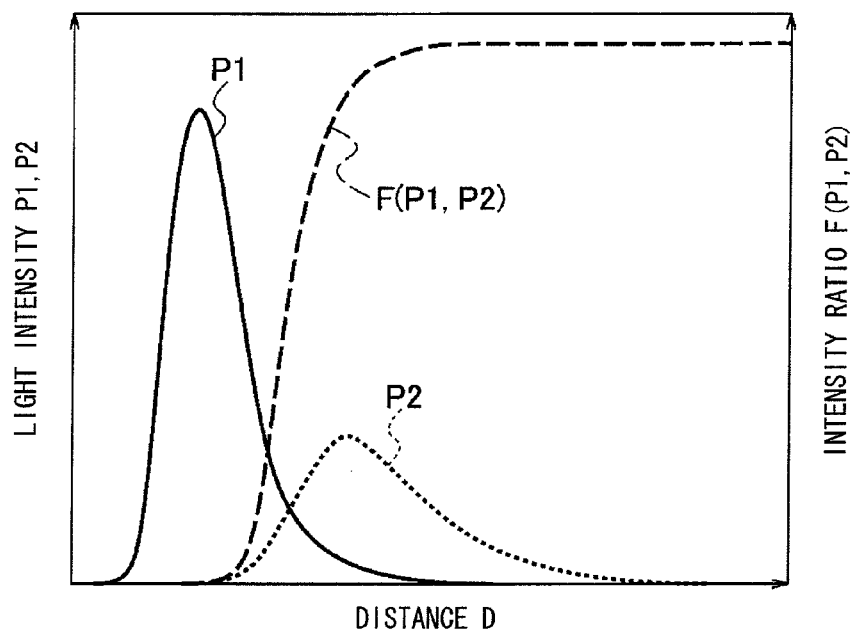
FIG. 4 is a graph illustrating an example of a relationship among a position of a reflecting plate, light intensities P1 and P2, and an F value.

FIG. 4 is a graph illustrating an example of a relationship among the position of the reflecting plate, the light intensities P1 and P2, and the F value. A horizontal axis indicates a distance D between the end surface of the light-emitting optical fiber 10 (see FIG. 1) and the reflecting surface of the reflecting plate 15. A vertical axis indicates the light intensities P1 and P2 and the F value. A peak of the light intensity P1 is positioned at a point where the distance D between the end surface of the light-emitting optical fiber 10 and the reflecting surface of the reflecting plate 15 is small. From this point, the light intensity P1 decreases as the distance D increases, and the light intensity P2 increases instead. When the distance D further increases, the light intensity P2 also decreases. Normally, the pressure (in other words, movement of the reflecting plate) is measured in a region in which the light intensity P1 decreases and the light intensity P2 increases, particularly in a region in which the F value changes substantially linearly.

Note that, output of the light source 5 is not always constant, and fluctuates to some extent due to disturbance and the like. Further, output capability of the light source 5 gradually decreases over time. Therefore, the light intensities P1 and P2 disadvantageously change in accordance with the output of the light source 5. Herein, the F value can be expressed as the following equation: $F(P1,P2)=((P1/P2)-1)/((P1/P2)+1)$. That is, the F value is the amount calculated from a ratio of the light intensities P1 and P2. When the intensity of the light emitted from the light-emitting optical fiber 10 is P0, the following equations can be put: $P1=a \times P0$, $P2=b \times P0$ ("a" and "b" are 0 or positive real numbers). Because $P1/P2=a/b$, the F value does not depend on the intensity P0 of the light emitted from the light-emitting optical fiber 10. Because of this, even when the output of the light source 5 changes, or even when the transmission loss in the light-emitting optical fiber 10 changes due to the loss variation section 16, the F value is not affected, therefore the pressure can be measured accurately by the optical pressure sensor 1. As described above, with this arrangement in which, in addition to the above-mentioned F value, the amount that can be calculated from a ratio of the light intensities P1 and P2 is used, the pressure can be measured accurately without influence of the change in the intensity P0 of the light emitted from the light-emitting optical fiber 10.

Herein, when water permeates into the sensor head 2, the intensity P0 of the light emitted from the light-emitting optical fiber 10 decreases due to the loss variation section 16, and the light intensities P1 and P2 received by the respective photodetectors also decrease. Therefore, when a value of (P1+P2) is out of a predetermined range, it is determined that an abnormality happens in the environmental condition of the sensor head 2 (water permeates the sensor head 2 beyond its tolerance).

The sum of the light intensity P1 received by the first photodetector 6 and the light intensity P2 received by the second photodetector 7 is used as an intensity reference value (P1+P2) by the calculation section 4, and when the intensity reference value becomes less than a predetermined threshold, the calculation section 4 sends a signal indicating detection of an abnormality to the alarm generation section 17. The alarm generation section 17, which received the signal indicating the detection of the abnormality, notifies the detection of the abnormality with use of notifying means such as sound, light, or displaying.

Although the light intensities P1 and P2 change comparatively largely with respect to the change in the distance D, the change in the intensity reference value (P1+P2) with respect to the change in the distance D is modest and barely changes in a range for use in a normal measurement (range of movement of the reflecting plate 15 in normal measurement). Therefore, the threshold is set in advance by adding a predetermined margin to a lower limit of a value range of (P1+P2)

ranging within the pressure range in which the optical pressure sensor 1 is supposed to be used. Preferably, the margin to be added in setting of the threshold is given in consideration of capability deterioration of the light source 5 over time and the change in the output of the light source 5 due to disturbance.

Also in the conventional optical pressure sensor, water sometimes permeates into the sensor head and a drop of water attaches to the reflecting plate, so that the light intensities P1 and P2 decrease. In this case, however, the light intensities P1 and P2 do not always decrease in an equal ratio. When water permeates so much that the decrease in the light intensity P1 or P2 can be detected, the F value highly possibly changes, thereby affecting the measurement of the pressure. Further, the optical pressure sensor itself may malfunction before water permeates so much that the decrease in the light intensity P1 or P2 is detected.

In this embodiment, the loss variation section 16 increases (changes) the transmission loss in the light-emitting optical fiber 10 in response to a small amount of the water present in the sensor head 2 (change in the environmental condition in the sensor head 2). Thus, by referring to the intensity reference value (P1+P2) being dependent on the intensity P0 of the light emitted from the light-emitting optical fiber 10, the calculation section 4 is capable of detecting the change in the environmental condition in the sensor head 2 while continuously being capable of performing accurate measurement of the pressure. Therefore, before the measurement of the pressure becomes impossible due to malfunction, the optical pressure sensor 1 detects the change in the environmental condition, to thereby detect a sign of an abnormality and notify a user of the sign of the abnormality.

In the case where the light-emitting optical fiber is a multi-mode optical fiber, stable measurement is difficult when the mode is changed by bend, stress, or other strength which are applied by the light-intensity variation section and accordingly a far field pattern (FFP) of the light thus emitted changes. In view of this, the light-emitting optical fiber 10 of the optical pressure sensor 1 of this embodiment is preferably configured such that the optical fiber is a single-mode optical fiber at least from (a) a part passing through the loss variation section 16 to (b) an emitting end of the optical-fiber holding section 13. When the single-mode optical fiber is for use in the light-emitting optical fiber 10 between (a) and (b), a mode field diameter (MFD) does not change in the loss variation section 16 even when a stress such as bend is applied by the loss variation section 16. Thus, an emitting pattern from the emitting end of the optical-fiber holding section 13 can be held constantly, whereby the detection of the environmental condition can be performed with high accuracy. Note that, whether an optical fiber is a single mode fiber or not depends on a wavelength of light to be used. Thus, what is meant by the term "single-mode optical fiber" herein is an optical fiber capable of transmitting the light emitted from the light source in a single mode.

The calculation section 4 may be so configured that the calculation section 4 compares the threshold with one of the light intensities P1 and P2 as an intensity reference value, so as to detect an abnormality in the environmental condition. As an alternative, the calculation section 4 may be so configured that the calculation section 4 compares the threshold with the weighted sum of the light intensities P1 and P2 ($c \times P1 + d \times P2$: "c", "d" are positive real numbers), so as to detect an abnormality in the environmental condition. A peak of the intensity of the light entering the light-receiving second optical fiber 12 provided farther from the light-emitting optical fiber 10 is lower than that of the light-receiving first optical fiber 11 provided nearer to the light-emitting optical fiber 10 (see the light intensities P1 and P2 of FIG. 4). Therefore, the sum of the light intensity P1 and the weighted light intensity P2 (for example, ($P1+2 \times P2$)) changes smaller in the range for use in the normal measurement and is close to a constant. When a change in the intensity reference value (weighted sum of the light intensities P1 and P2) with respect to a change in physical quantity (movement of the reflecting plate 15) to be obtained by the optical sensor becomes smaller, tolerance level (threshold) can be set with a smaller margin, whereby an abnormality in the environmental condition can be detected with a higher sensitivity.

For example, the calculation section 4 may be so configured that the table stores in advance (at the stage after calibrating the optical sensor), correspondence between values of the light intensity P1 in the normal state and the respective F values in the normal state, so that the abnormality in the environmental condition can be detected by the calculation section 4 by comparing (i) a measured value of the light intensity P1 corresponding to one F value with (ii) corresponding one of the stored values of the light intensity P1 in the normal state. That is, the threshold changing in accordance with the F value may be compared with the intensity reference value (light intensity P1, light intensity P2, or weighted sum of the light intensity P1 and the light intensity P2).

Further, by forming the loss variation section with use of a member having a character that changes (deforms) in accordance with specific liquid or gas, the optical sensor detecting a change in of the specific liquid or gas can be configured.

Still further, in stead of measuring the pressure based on the movement of the reflecting plate, a sensor head in which the position of the reflecting plate changes in accordance with a change in temperature (or another physical quantity) can be formed, whereby an optical sensor for measuring the temperature (or another physical quantity) by measuring the movement of the reflecting plate can be configured.

(Other Configuration Examples of Loss Variation Section)

Figure 5:
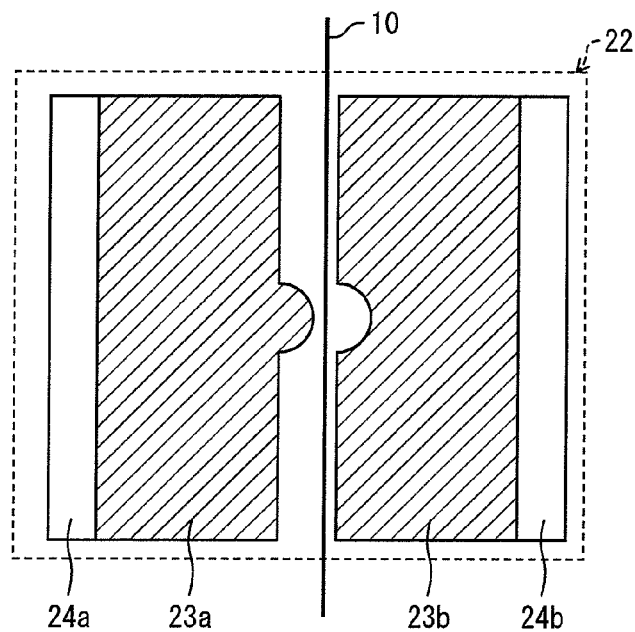
FIG. 5 is a sectional view illustrating another configuration example of the loss variation section of FIG. 1.

FIG. 5 is a sectional view illustrating another configuration example of the loss variation section. A loss variation section 22 is used in stead of or together with the loss variation section 16 illustrated in FIG. 1. The loss variation section 22 includes a convex member 23a and a concave member 23b that are made of a metal or metals. A convex part formed in the convex member 23a and a concave part formed in the concave member 23b face to each other. Further, the convex member 23a is provided with a water-absorbable resin 24a on a surface of the convex member 23a opposite to a surface thereof having the convex part. The water-absorbable resin 24a is fixed to a housing of the sensor head on a surface thereof opposite to a surface thereof held in contact with the convex member 23a. Similarly, the concave member 23b is provided with a water-absorbable resin 24b on a surface thereof opposite to a surface having the concave part. The water-absorbable resin 24b is fixed to the housing of the sensor head on a surface thereof opposite to a surface of the water-absorbable resin 24b held in contact with the concave member 23b. The light-emitting optical fiber 10 passes through a gap between the convex part of the convex member 23a and the concave part of the concave member 23b.

When water permeates into the sensor head, the water-absorbable resins 24a and 24b of the loss variation section 22 absorb water and swell, to thereby approximate the convex member 23a and the concave member 23b to each other. Thereby, the convex part of the convex member 23a and the concave part of the concave member 23b press the light-emitting optical fiber 10 from both sides, to thereby apply the lateral pressure and bend the light-emitting optical fiber 10. Accordingly, the curvature of the light-emitting optical fiber 10 locally changes, whereby the transmission loss in the light-emitting optical fiber 10 increases.

Figure 6:
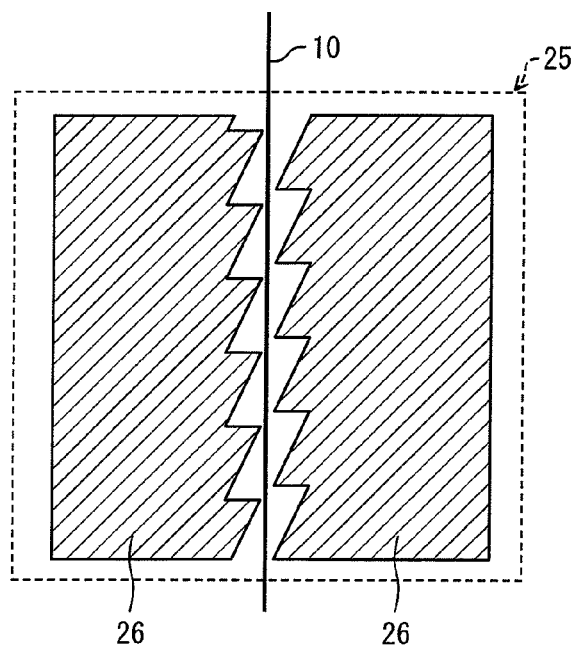
FIG. 6 is a sectional view illustrating still another configuration example of the loss variation section of FIG. 1.

FIG. 6 is a sectional view illustrating still another configuration example of the loss variation section. A loss variation section 25 is used instead of or together with the loss variation section 16 illustrated in FIG. 1. The loss variation section 25 includes two facing members 26 that are made of a metal or metals and face to each other with a certain gap therebetween. The two facing members 26 have concave-convex parts engaging with each other on their facing surfaces, and are fixed to the sensor head via their respective surfaces opposite to the facing surfaces having the concave-convex parts. The light-emitting optical fiber 10 passes through a gap between the concave-convex parts of the two facing members 26.

The loss variation section 25 changes the transmission loss in the light-emitting optical fiber 10 in accordance with the temperature in the sensor head. The two facing members 26 made of metal thermally expand as the temperature becomes high, and sandwich the light-emitting optical fiber 10 between the facing concave-convex parts. Then, the light-emitting optical fiber 10 is bent in a zigzag manner along concavities and convexities. Thus, the curvature of the light-emitting optical fiber 10 and the lateral pressure to be applied thereto locally change, whereby the transmission loss in the light-emitting optical fiber 10 increases.

Figure 7:
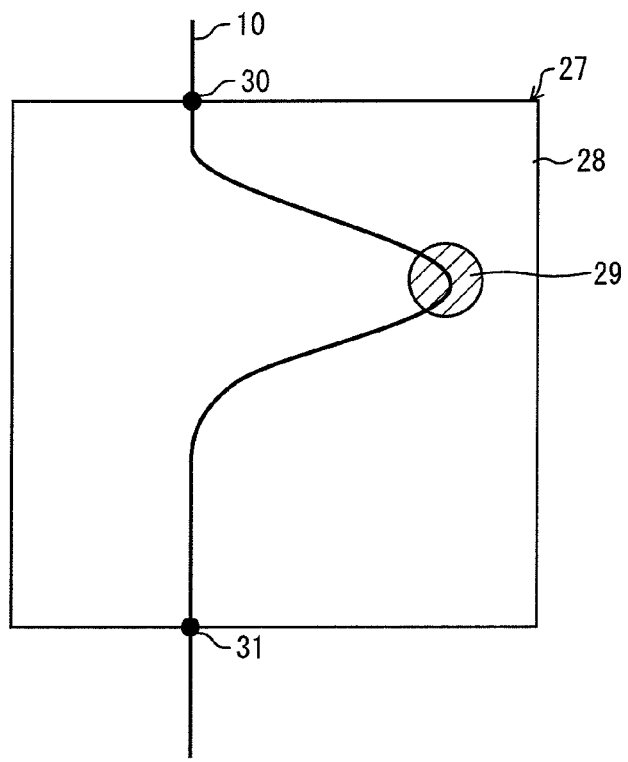
FIG. 7 is a plan view illustrating yet another configuration example of the loss variation section of FIG. 1.

FIG. 7 is a plan view illustrating still another configuration example of the loss variation section. A loss variation section 27 is used instead of or together with the loss variation section 16 illustrated in FIG. 1. The loss variation section 27 includes a holding resin 29 and a flat plate 28 fixed to the sensor head. The light-emitting optical fiber 10 is fixed to the flat plate 28 by holding means (metal, resin, adhesive, or the like) at two holding points 30 and 31 positioned in an upper end and a lower end of the flat plate 28. Further, in order to retain a state of being bent, the light-emitting optical fiber 10 is fixed by the holding resin 29 between the two holding points 30 and 31 positioned in the upper end and the lower end thereof. The light-emitting optical fiber 10 is fixed in a state of storing an elastic energy by the holding resin 29. The sheet-like holding resin 29 fixes the light-emitting optical fiber 10 positioned near the upper-end holding point 30 by attaching to the flat plate 28.

The holding resin 29 is made of resin (for example, acrylic resin) which adsorbs water under a highly humidity environment so as to have a lower adhesive strength. When water permeates into the sensor head, the holding resin 29 of the loss variation section 27 is lowered in adhesive strength, so as to be peeled off, whereby the light-emitting optical fiber 10 held in a state of being bent is released from the state of being bent. Thus, the elastic energy of the light-emitting optical fiber 10 is released and the curvature of the light-emitting optical fiber 10 decreases, therefore the transmission loss in the light-emitting optical fiber 10 decreases. For example, when the intensity reference value (P1+P2) becomes higher than a predetermined threshold, the calculation section determines that water permeates into the sensor head, and sends a signal indicating detection of an abnormality to the alarm generation section.

As another configuration example, there may be used a loss variation section in which concavity and convexity are formed on a cylindrical surface of a cylindrical member having a diameter that changes in accordance with the change in the environmental condition and in which the light-emitting optical fiber is wound around the cylindrical surface thereof having the concavity and convexity. Thus, when the diameter of the cylindrical member increases due to the change in the environmental condition, a part of the cylindrical member (convex part formed on the cylindrical surface) presses to bend the light-emitting optical fiber. Then, the radius of the curvature of the light-emitting optical fiber increases, and a bend loss increases, therefore the transmission loss in the light-emitting optical fiber increases.

Figure 8:
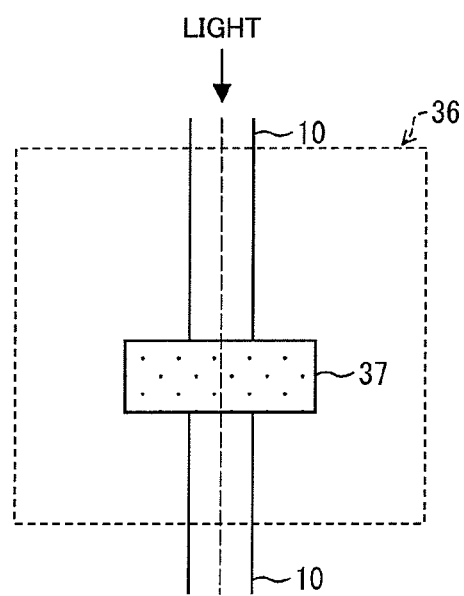
FIG. 8 is a sectional view illustrating still yet another configuration example of the loss variation section of FIG. 1.

FIG. 8 is a sectional view illustrating still another configuration example of the loss variation section. A loss variation section 36 is used instead of or together with the loss variation section 16 illustrated in FIG. 1. In FIG. 8, a broken line shows an optical axis transmitting through the light-emitting optical fiber 10. In the loss variation section 36 inside the sensor head, the light-emitting optical fiber 10 is cut (divided) into two parts, thereby having two cut surfaces at where the light-emitting optical fiber 10 is divided. The two cut surfaces of the light-emitting optical fiber 10 face to each other with a minute distance therebetween. The loss variation section 36 includes a moisture sensitive member (transmitting member) 37 between the two cut surfaces of the light-emitting optical fiber 10. The moisture sensitive member 37 contains a material (for example, cobalt chloride) having a color that changes in accordance with the ambient humidity, and causes the light emitted from the light source to pass therethrough.

Herein, when the humidity in the sensor head becomes high, the color of the moisture sensitive member 37 changes, and hence transmissivity in the moisture sensitive member 37 with respect to the light emitted from the light source is reduced. Therefore, the transmission loss in the light-emitting optical fiber 10 including the loss variation section 36 changes in accordance with the change in the humidity in the sensor head. For example, under high humidity in the sensor head, the intensity of the light emitted from the light-emitting optical fiber 10 becomes small.

Further, the loss variation section may be configured without a moisture sensitive member. For example, the loss variation section 37 in which the light-emitting optical fiber is divided into two parts is provided in the vicinity of a place where an optical fiber cable comes out of the sensor head and thus water permeation is highly possible. In the case where water permeates into the sensor head, when a drop of water attaches to a gap between facing cut surfaces of the light-emitting optical fiber, the transmission loss in the light-emitting optical fiber increases.

Embodiment 2

In this embodiment, description will be made of configuration in which measurement of a physical quantity and detection of an abnormality are performed with use of two kinds of light having different wavelengths. For the sake of easy explanation, members and configurations having the like functions as the figures described in Embodiment 1 are denoted by the like symbols and the detailed description thereof is omitted.

(Configuration of Optical Pressure Sensor)

Figure 9:
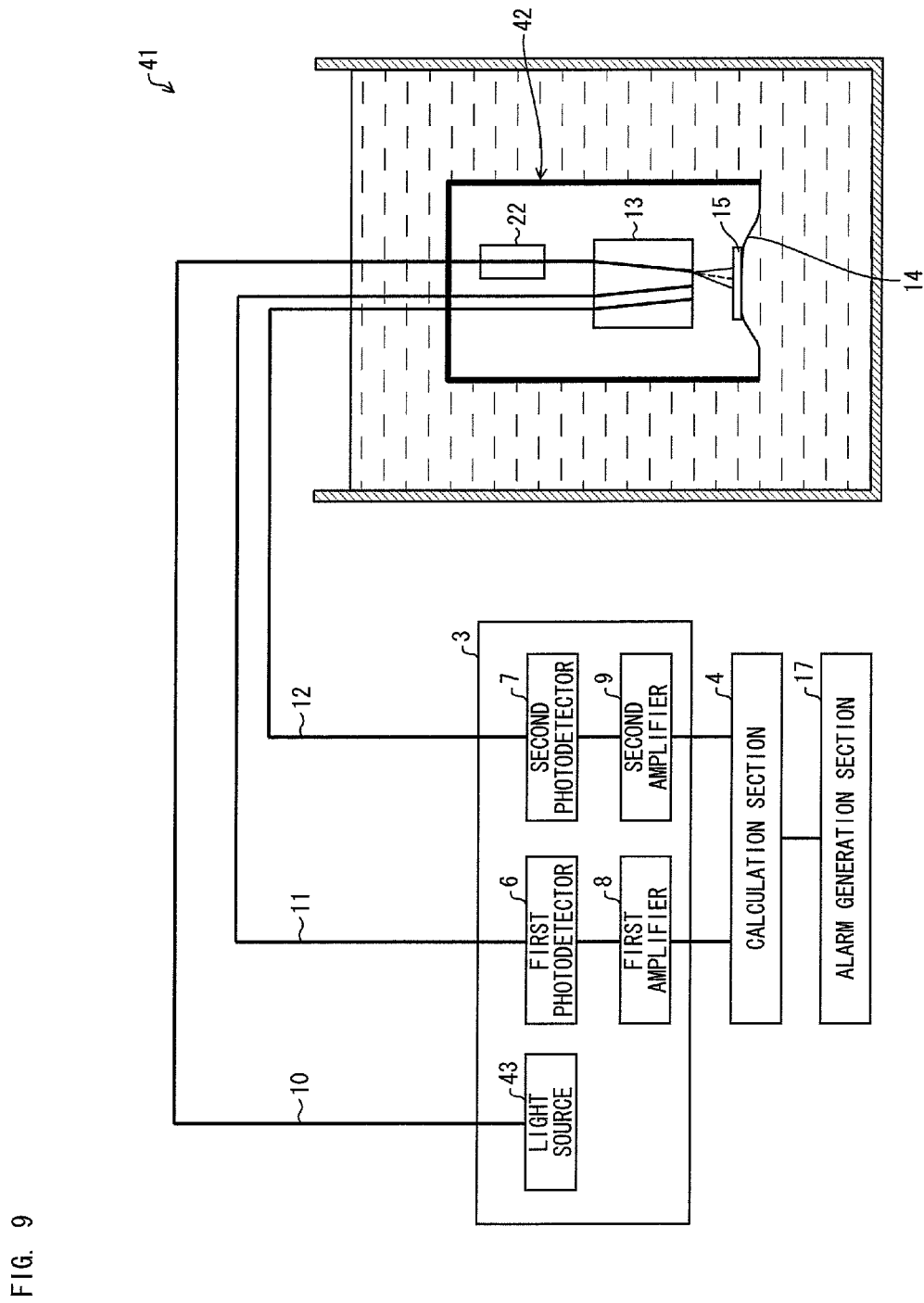
FIG. 9 is a schematic view illustrating configuration of an optical pressure sensor according to Embodiment 2 of the present invention.
Figure 10:
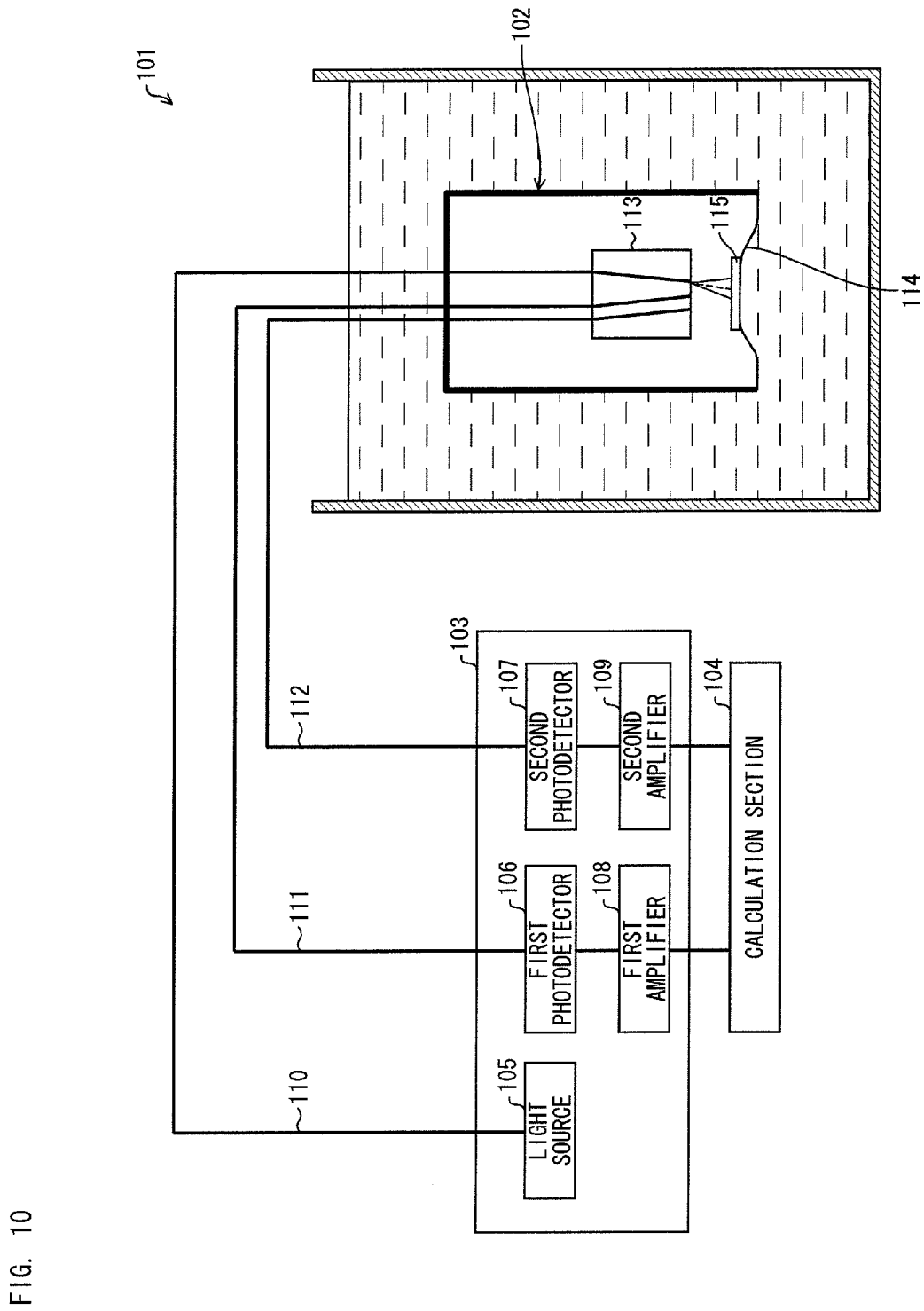
FIG. 10 is a schematic view illustrating configuration of a conventional optical pressure sensor.
Figure 11:
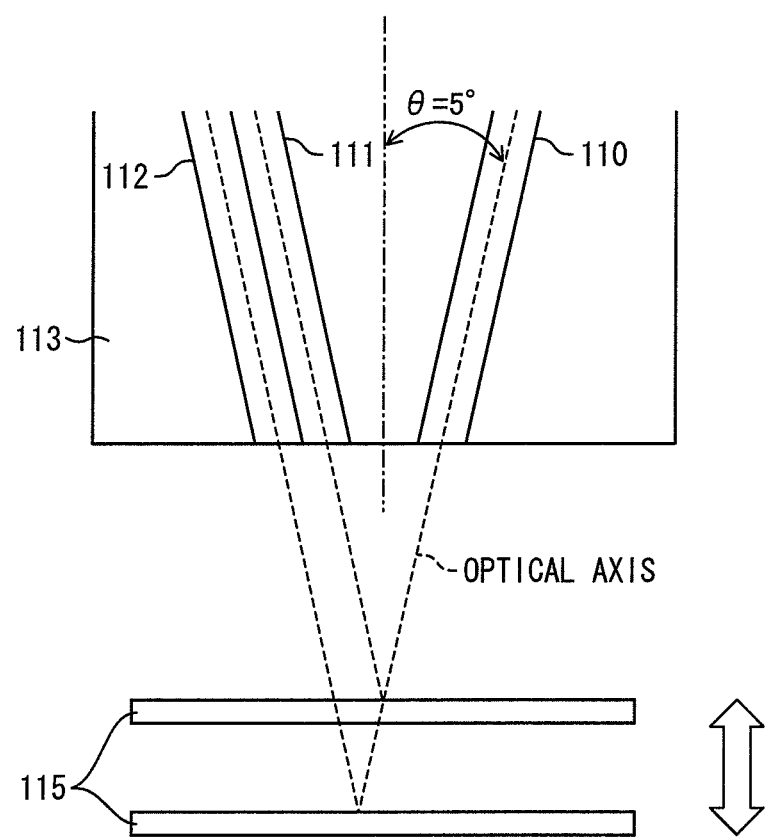
FIG. 11 is an enlarged sectional view illustrating a main part of the sensor head of FIG. 10.

FIG. 9 is a schematic view illustrating configuration of an optical pressure sensor according to this embodiment. An optical pressure sensor (optical sensor) 41 includes a sensor head 42, an optical device 3, a calculation section (processing section) 4, and an alarm generation section 17. The optical device 3 includes a light source 43, a first photodetector 6, a second photodetector 7, a first amplifier 8, and a second amplifier 9. The light source 43 emits two kinds of light having different wavelengths.

The sensor head 42 includes a loss variation section (light-intensity variation section) 22 as illustrated in FIG. 5 instead of the loss variation section 16 exemplified in FIG. 1. Light having a first wavelength and light having a second wavelength emitted from the light source 43 pass through the same path, and reach the sensor head 42. Then, the light having the first wavelength and the light having the second wavelength pass through the loss variation section 22, and are transmitted from the sensor head 42 to the first photodetector 6 and the second photodetector 7 of the optical device 3 by the light-receiving first optical fiber 11 and the light-receiving second optical fiber 12. The pass for the light from the light source 43 to the photodetector 6 or 7 is same as in Embodiment 1, and the detailed description thereof is omitted.

The first photodetector 6 and the second photodetector 7 receive two kinds of light transmitted through the light-receiving first optical fiber 11 and the light-receiving second optical fiber 12. The respective photodetectors 6 and 7 generate electrical signals indicating a sum of the intensities of the two kinds of light having different wavelengths in accordance with each of susceptibility of the wavelengths. The electrical signals generated in the first photodetector 6 and the second photodetector 7 are supplied to the first amplifier 8 and the second amplifier 9, respectively.

The first amplifier 8 and the second amplifier 9 each amplify the received electrical signals, and send, to the calculation section 4, the electrical signals thus amplified. The calculation section 4 calculates a physical quantity such as a pressure from the respective electrical signals.

(Configuration of Loss Variation Section)

Herein, under high humidity in the sensor head, the loss variation section 22 illustrated in FIG. 5 changes the curvature of the light-emitting optical fiber 10. Generally, bend loss in an optical fiber with respect to light having a specific wavelength increases sharply from a certain curvature. Therefore, when attempting to perform both the measurement of the pressure and the detection of the abnormality in the environmental condition (change in the curvature of the optical fiber) with use of only one kind of light having a certain wavelength, setting of the threshold becomes difficult. However, the curvature causing a sharp increase in the bend loss in the optical fiber for light having a shorter wavelength is relatively larger than that for light having a longer wavelength (radius of the curvature is comparatively small). In other words, the transmission loss in the light having the long wavelength is sharply increased by comparatively small bend of the optical fiber. Therefore, between the two kinds of light having different wavelengths, the transmission loss in the light having a longer wavelength increases first under high humidity in the sensor head in the loss variation section 22. Even when the photodetectors cannot detect the light having the longer wavelength, the measurement of the physical quantity can be performed with use of the light having the shorter wavelength. By detecting the change (decrease) of the light intensity of the long wavelength, the abnormality in the environmental condition can be detected. As described above, configuration that changes the curvature of the light-emitting optical fiber in accordance with the change in the environmental condition in the sensor head can be preferably for use in a optical sensor for measuring the physical quantity and for detecting the change in the environmental condition by using the two kinds of light having the different wavelengths.

In this embodiment, the first wavelength is set to be shorter than the second wavelength. The light having the second wavelength emitted from the light-emitting optical fiber 10 has a higher intensity attrition rate against an increase in humidity in the sensor head than that of the light having the first wavelength.

(Measurement of Pressure and Detection of Abnormality)

Putting that: the intensity of the light received by the first photodetector 6 (in other words, the light intensity indicated by the electrical signal supplied by the first amplifier 8) is P1; and the intensity of the light received by the second photodetector 7 (in other words, the light intensity indicated by the electrical signal supplied by the second amplifier 9) is P2; and the light intensity ratio calculated in the calculation section 4 with use of the light intensities P1 and P2 is F value, the F value is obtained by calculating the following equation: $F(P1, P2)=(P1-P2)/(P1+P2)$. The F value thus obtained is compared with the table calibrated in advance or the like. In this way, a pressure to be applied to the diaphragm 14 and a depth of water of the diaphragm 14 can be found out.

In this embodiment, the photodetector 6 and the photodetector 7 are identical in terms of susceptibility with respect to the light. Further, a ratio of contribution of the light having the first wavelength in the light intensity P1 to contribution of the light having the second wavelength is substantially the same as a ratio of contribution of the light having the first wavelength in the light intensity P2 to contribution of the light having the second wavelength (that is, for example, the transmission losses in the light-receiving optical fibers 11 and 12 with respect to the two kinds of light having the respective wavelengths are the same, and reflectance of the reflecting plate 15 in the light-receiving optical fiber 11 is the same as that in the light-receiving optical fiber 12). Putting that the intensity of the light having the first wavelength emitted from the light-emitting optical fiber 10 is Pa0 and the intensity of the light having the second wavelength emitted therefrom is Pb0, the following equations can be held: $P1=a\times(Pa0+Pb0)$, $P2=b\times(Pa0+Pb0)$ ("a", "b" are 0 or positive real numbers). Thus, the pressure can be measured with use of a ratio (a/b) of the light intensities P1 and P2.

Further, under high humidity in the sensor head 42, Pb0 remarkably decreases prior to Pa0. Even when Pb0 sharply decreases and photodetectors 6 and 7 cannot detect a component of the second wavelength, the pressure can be kept on measuring with use of the first wavelength because Pa0 does not change as much as Pb0 does. Further, the reference intensity (P1+P2) decreases along with decrease of Pb0, therefore the calculation section 4 can detect the change in the environmental condition by comparing the reference intensity (P1+P2) with the threshold.

In this embodiment, when an abnormality happens in the environmental condition of the sensor head 42, the abnormality in the environmental condition of the sensor head 42 can be detected by using the two kinds of light having the different wavelengths while continuously being capable of performing accurate measurement of the pressure with use of one of the two kinds of light having the different wavelengths.

Each of the first photodetector 6 and the second photodetector 7 may be configured so as to generate the electrical signals indicating the respective intensities of the light corresponding to the every different wavelengths. That is, the first photodetector 6 generates a first electrical signal indicating the intensity of the received light having the first wavelength and a second electrical signal indicating the intensity of the received light having the second wavelength. The second photodetector 7 generates a third electrical signal indicating the intensity of the received light having the first wavelength and a fourth electrical signal indicating the intensity of the received light having the second wavelength.

In this case, the calculation section 4 calculates a physical quantity such as a pressure with use of the first electrical signal and the third electrical signal each corresponding to the light having the first wavelength. Method for calculation of the pressure is same as that of Embodiment 1. Meanwhile, the calculation section 4 detects the change in the humidity in the sensor head 42 with use of the second electrical signal and the fourth electrical signal each corresponding to the light having the second wavelength.

The change in the intensity of the light having the first wavelength is smaller than that of the intensity of the light having the second wavelength. This makes it possible to perform accurate measurement of pressure even under high humidity in the sensor head 42. Meanwhile, the intensity of the light having the second wavelength changes greater than that of the light having the first wavelength in accordance with the change in the humidity in the sensor head 42. As a result, under high humidity in the sensor head 42, the transmission loss in the light-emitting optical fiber 10 with respect to the light having the second wavelength increases and the light having the second wavelength is attenuated. The intensity of the light having the second wavelength received by the first photodetector 6 (light intensity indicated by the second electrical signal) and the intensity of the light having the second wavelength received by the second photodetector 7 (light intensity indicated by the fourth electrical signal) are compared with the threshold in the same method as in Embodiment 1, and thus the change in the humidity in the sensor head 42 can be detected.

In the above-mentioned configuration, only the light having the first wavelength is for use in measuring a physical quantity, and only the light having the second wavelength is for use in detecting the change in the environmental condition. Thus, even when the environmental condition in the sensor head 42 changes, it is still possible to measure the physical quantities accurately with use of the light having the first wavelength.

(Another Configuration Example of Loss Variation Section)

Further, configuration illustrated in FIG. 8 including the moisture sensitive member 37 in the middle of the pass of the light-emitting optical fiber may be used instead of the loss variation section 22 illustrated in FIG. 9. In this case, the moisture sensitive member 37 may be configured so that the two kinds of light having the different wavelengths pass through the moisture sensitive member 37 and transmissivity with respect to the light having the first wavelength or the light having the second wavelength changes in accordance with the change in the environmental condition in the sensor head. As an alternative, the moisture sensitive member 37 may be configured so that transmissivity with respect to both the first wavelength and the second wavelength changes in accordance with the environmental condition.

SUMMARY

As described above, according to the present invention, the sensor head for use in the optical sensor for measuring a physical quantity includes: the first optical fiber for transmitting the light emitted from the light source; the reflector whose position relative to the end surface of the first optical fiber moves in accordance with a physical quantity and which reflects the light emitted from the end surface of the first optical fiber; and the second optical fiber and a third optical fiber, each of which having the end surface that the light reflected by the reflector enters, and for transmitting the entered light to the photodetector, and in order to attain the above-mentioned object, the sensor head for the optical sensor includes the light-intensity variation section that changes the transmission loss in the first optical fiber in accordance with the change in the environmental condition in the sensor head.

According to the above-mentioned configuration, the transmission loss in the first optical fiber changes in accordance with the change in the environmental condition in the sensor head, and the intensities of the light entering the second optical fiber and the third optical fiber change at the same level. Therefore, the physical quantity can be obtained by the optical sensor including the above-mentioned sensor head based on a ratio of the intensities of the light transmitted through the second optical fiber and the third optical fiber, and also can detect the change in the environmental condition in the sensor head from the intensities of the light transmitted through the second optical fiber and the third optical fiber. Thus, a user can find an abnormality of the environmental condition in the sensor head and perform a maintenance before the physical quantity cannot be obtained because of malfunction of the sensor head. Hence, there can be suppressed a situation in which the sensor head suddenly malfunctions and cannot be for use in measuring the physical quantity.

Movement or temperature of an object, pressure to be applied to the object, and the like are given as examples of physical quantities to be measured. Further, temperature, humidity, and specific gas (natural gas, for example) or liquid (crude oil, for example) which permeates into the sensor head are given as examples of the environmental condition.

Further, the light-intensity variation section may be configured so as to change the transmission loss in the first optical fiber in accordance with the change in the environmental condition in the sensor head by changing the curvature of the first optical fiber, by changing the lateral pressure applying to the first optical fiber, or by changing the tensile strength applying to the first optical fiber.

The transmission loss in the optical fiber changes in accordance with the curvature of the optical fiber, the lateral pressure applying to the optical fiber, the tensile strength applying to the optical fiber, or the like. That is, by changing the curvature of the first optical fiber, the lateral pressure applying to the first optical fiber, the tensile strength applying to the first optical fiber in accordance with the change in the environmental condition in the sensor head, the transmission loss in the first optical fiber can be changed. Note that, as a matter of course, the light-intensity variation section may be configured so that the transmission loss in the first optical fiber is changed by combining the change in the curvature of the first optical fiber, the change in the lateral pressure applying to the first optical fiber, and the change in the tensile strength applying to the first optical fiber.

Further, in the above-mentioned light-intensity variation section, the first optical fiber may be divided to have cut surfaces at where the first optical fiber is divided and the cut surfaces of the first optical fiber may be provided so as to face to each other with a certain distance therebetween.

According to the above-mentioned configuration, a foreign body (for example, a drop of water) entering the inside of the sensor head enters a space between the divided cut-surfaces of the first optical fiber, and thus scattering or absorption of the light transmitted between the divided cut-surfaces of the first optical fiber happens, to thereby change the transmission loss in the first optical fiber.

Further, the above-mentioned light-intensity variation section may include a transmitting member provided between the above-mentioned divided cut-surfaces of the first optical fiber, and, in the transmitting member, the above-mentioned transmissivity with respect to light having a specific wavelength may change in accordance with the change in the environmental condition in the sensor head.

According to the above-mentioned configuration, the transmitting member provided between the divided cut-surfaces of the first optical fiber changes the intensity of the light passing therebetween in accordance with the change in the environmental condition in the sensor head, to thereby change the transmission loss in the first optical fiber.

The optical sensor according to the present invention includes: the sensor head; the light source; the first photodetector for receiving the light transmitting through the second optical fiber from the above-mentioned sensor head and generating the electrical signal indicating the intensity of the light thus received; the second photodetector for receiving the light transmitted through the third optical fiber from the sensor head and generating the electrical signal indicating the intensity of the light thus received; and the processing section for calculating the physical quantity the ratio of a light intensity indicated by the electrical signal generated in the first photodetector to a light intensity indicated by the electrical signal generated in the second photodetector, and for detecting the change in the environment condition in the above-mentioned sensor head with use of any one of the following: the sum or the weighted sum of the light intensity indicated by the electrical signal generated in the first photodetector and the light intensity indicated by the electrical signal generated in the second photodetector; the light intensity indicated by the electrical signal generated in the first photodetector; and the light intensity indicated by the electrical signal generated in the second photodetector.

According to the above-mentioned configuration, the physical quantity can be obtained without influence of the change in the output of the light source and the transmission loss in the first optical fiber by using a ratio of the light intensity indicated by the electrical signal generated in the first photodetector to the light intensity indicated by the electrical signal generated in the second photodetector. In addition, the change in the transmission loss in the first optical fiber can be also detected by using the sum of the light intensity indicated by the electrical signal generated in the first photodetector and the light intensity indicated by the electrical signal generated in the second photodetector (or any one of the weighted sum thereof, the light intensity indicated by the electrical signal generated in the first photodetector, and the light intensity indicated by the electrical signal generated in the second photodetector). Hence, a change in the environment condition can be detected while keeping on measuring the physical quantity.

Further, the optical sensor according to the present invention may include: the above-mentioned sensor head; and the light source for emitting the light having the first wavelength and the light having the second wavelength, and the light-intensity variation section may be configured so as to change the transmission loss in the first optical fiber with respect to one of the light having the first wavelength and the light having the second wavelength in accordance with the change in the environmental condition in the above-mentioned sensor head.

According to the above-mentioned configuration, the change in the environmental condition can be detected by using one intensity of the light having the certain wavelength which changes in accordance with the change in the environmental condition. Further, for example, even when the transmission loss in the first optical fiber with respect to one intensity of the light increases too much and the one intensity of the light cannot be detected, the physical quantities can be obtained by using the other intensity of the light having the wavelength.

The present invention is not limited to the description of the embodiments above, and may be modified in numerous ways by a skilled person as long as such modification falls within the scope of the claims. An embodiment based on a proper combination of technical means disclosed in different embodiments is encompassed in the technical scope of the present invention.

INDUSTRIAL APPLICABILITY

The present invention can be for use in an optical sensor, a sensor head including the optical sensor.

REFERENCE SIGNS LIST 1, 41 optical pressure sensor (optical sensor)
2, 42 sensor head
3 optical device
4 calculation section (processing section)
5, 43 light source
6 first photodetector
7 second photodetector
8 first amplifier
9 second amplifier
10 light-emitting optical fiber
11 light-receiving first optical fiber
12 light-receiving second optical fiber
13 holding section
14 diaphragm
15 reflecting plate (reflector)
16, 22, 25, 27, 36 loss variation section (light-intensity variation section)
17 alarm generation section
20 housing
21, 24a, 24b water-absorbable resin
23a convex member
23b concave member
26 facing member
28 flat plate
29 holding resin
37 moisture sensitive member (transmitting member)

The invention claimed is:

1. A sensor head for use in an optical sensor for measuring a physical quantity, the sensor head comprising:
a first optical fiber for transmitting light emitted from a light source;
a reflector whose position relative to an end surface of the first optical fiber moves in accordance with the physical quantity and which reflects the light emitted from the end surface of the first optical fiber;
a second optical fiber and a third optical fiber, each of which has an end surface that the light reflected by the reflector enters, and transmits the light thus entered to a photodetector; and
a light-intensity variation section that changes a transmission loss in the first optical fiber in accordance with a change in environmental condition in the sensor head,
wherein the system formed by the sensor head, the fibers and the detectors is configured to detect an abnormality of the environmental condition in the sensor head by determining a change in the amount of light received by the second optical fiber and the third optical fiber, and to determine, concurrently with the detection of the abnormality of the environmental condition in the sensor head, the physical quantity by use of a ratio of the amount of the light received by the second optical fiber and the amount of the light received by the third optical fiber.

2. The sensor head according to claim 1, wherein the light-intensity variation section changes the transmission loss in the first optical fiber by changing, in accordance with the change in the environmental condition in the sensor head, (i) a curvature of the first optical fiber, (ii) a lateral pressure applied to the first optical fiber, or (iii) a tensile strength applied to the first optical fiber.

3. An optical sensor, comprising:
a sensor head according to claim 2;
a light source;
a first photodetector for receiving light transmitted through the second optical fiber from the sensor head and generating an electrical signal indicating a light intensity of the light thus received;
a second photodetector for receiving light transmitted through the third optical fiber from the sensor head and generating an electrical signal indicating a light intensity of the light thus received; and
a processing section for calculating the physical quantity with use of a ratio of the light intensity indicated by the electrical signal generated in the first photodetector to the light intensity indicated by the electrical signal generated in the second photodetector, and for detecting the abnormality of the environment condition in the sensor head by comparing a threshold with any one of the following: a sum of the light intensity indicated by the electrical signal generated in the first photodetector and the light intensity indicated by the electrical signal generated in the second photodetector; a weighted sum of the light intensity indicated by the electrical signal generated in the first photodetector and the light intensity indicated by the electrical signal generated in the second photodetector; the light intensity indicated by the electrical signal generated in the first photodetector; and the light intensity indicated by the electrical signal generated in the second photodetector.

4. An optical sensor, comprising:
a sensor head according to claim 2; and
a light source for emitting light having a first wavelength and light having a second wavelength,
wherein the light-intensity variation section changes, in accordance with the change in the environmental condition in the sensor head, a transmission loss in the first optical fiber with respect to one of the light having the first wavelength and the light having the second wavelength.

5. The sensor head according to claim 1, wherein:
in the light-intensity variation section, the first optical fiber is divided to have cut surfaces; and
the cut surfaces of the first optical fiber are provided so as to face to each other with a certain distance therebetween.

6. The sensor head according to claim 5, wherein:
the light-intensity variation section includes a transmitting member provided between the cut surfaces of the first optical fiber; and
a change in the environmental condition in the sensor head causes the transmitting member to change its transmissivity with respect to light having a specific wavelength.

7. An optical sensor, comprising:
a sensor head according to claim 6;
a light source;
a first photodetector for receiving light transmitted through the second optical fiber from the sensor head and generating an electrical signal indicating a light intensity of the light thus received;
a second photodetector for receiving light transmitted through the third optical fiber from the sensor head and generating an electrical signal indicating a light intensity of the light thus received; and
a processing section for calculating the physical quantity with use of a ratio of the light intensity indicated by the electrical signal generated in the first photodetector to the light intensity indicated by the electrical signal generated in the second photodetector, and for detecting the abnormality of the environment condition in the sensor head by comparing a threshold with any one of the following: a sum of the light intensity indicated by the electrical signal generated in the first photodetector and the light intensity indicated by the electrical signal generated in the second photodetector; a weighted sum of the light intensity indicated by the electrical signal generated in the first photodetector and the light intensity indicated by the electrical signal generated in the second photodetector; the light intensity indicated by the electrical signal generated in the first photodetector; and the light intensity indicated by the electrical signal generated in the second photodetector.

8. An optical sensor, comprising:
a sensor head according to claim 6; and
a light source for emitting light having a first wavelength and light having a second wavelength,
wherein the light-intensity variation section changes, in accordance with the change in the environmental condition in the sensor head, a transmission loss in the first optical fiber with respect to one of the light having the first wavelength and the light having the second wavelength.

9. An optical sensor, comprising:
a sensor head according to claim 5;
a light source;
a first photodetector for receiving light transmitted through the second optical fiber from the sensor head and generating an electrical signal indicating a light intensity of the light thus received;
a second photodetector for receiving light transmitted through the third optical fiber from the sensor head and generating an electrical signal indicating a light intensity of the light thus received; and
a processing section for calculating the physical quantity with use of a ratio of the light intensity indicated by the electrical signal generated in the first photodetector to the light intensity indicated by the electrical signal generated in the second photodetector, and for detecting the abnormality of the environment condition in the sensor head by comparing a threshold with any one of the following: a sum of the light intensity indicated by the electrical signal generated in the first photodetector and the light intensity indicated by the electrical signal generated in the second photodetector; a weighted sum of the light intensity indicated by the electrical signal generated in the first photodetector and the light intensity indicated by the electrical signal generated in the second photodetector; the light intensity indicated by the electrical signal generated in the first photodetector; and the light intensity indicated by the electrical signal generated in the second photodetector.

10. An optical sensor, comprising:
a sensor head according to claim 5; and
a light source for emitting light having a first wavelength and light having a second wavelength,
wherein the light-intensity variation section changes, in accordance with the change in the environmental condition in the sensor head, a transmission loss in the first optical fiber with respect to one of the light having the first wavelength and the light having the second wavelength.

11. An optical sensor, comprising:
a sensor head according to claim 1;
a light source;
a first photodetector for receiving light transmitted through the second optical fiber from the sensor head and generating an electrical signal indicating a light intensity of the light thus received;
a second photodetector for receiving light transmitted through the third optical fiber from the sensor head and generating an electrical signal indicating a light intensity of the light thus received; and
a processing section for calculating the physical quantity with use of a ratio of the light intensity indicated by the electrical signal generated in the first photodetector to the light intensity indicated by the electrical signal generated in the second photodetector, and for detecting the abnormality of the environment condition in the sensor head by comparing a threshold with any one of the following: a sum of the light intensity indicated by the electrical signal generated in the first photodetector and the light intensity indicated by the electrical signal generated in the second photodetector; a weighted sum of the light intensity indicated by the electrical signal generated in the first photodetector and the light intensity indicated by the electrical signal generated in the second photodetector; the light intensity indicated by the electrical signal generated in the first photodetector; and the light intensity indicated by the electrical signal generated in the second photodetector.

12. An optical sensor, comprising:
a sensor head according to claim 1; and
a light source for emitting light having a first wavelength and light having a second wavelength,
wherein the light-intensity variation section changes, in accordance with the change in the environmental condition in the sensor head, a transmission loss in the first optical fiber with respect to one of the light having the first wavelength and the light having the second wavelength.

13. The sensor head according to claim 1, wherein the light-intensity variation section changes the transmission loss in the first optical fiber by changing a macro-bend curvature or a curvature of a central axis of the first optical fiber in accordance with the change in the environmental condition in the sensor head.

14. An optical sensor, comprising:
a sensor head according to claim 1;
a light source;
a first photodetector for receiving light transmitted through the second optical fiber from the sensor head and generating an electrical signal indicating a light intensity of the light thus received;
a second photodetector for receiving light transmitted through the third optical fiber from the sensor head and generating an electrical signal indicating a light intensity of the light thus received; and
a processing section for detecting the abnormality of the environment condition in the sensor head, wherein the processing section calculates a weighted sum of the light intensity indicated by the electrical signal generated in the first photodetector and the light intensity indicated by the electrical signal generated in the second photodetector.

15. An optical sensor, comprising:
a sensor head according to claim 1;
a light source for emitting light having a first wavelength and light having a second wavelength;
a first photodetector for receiving light transmitted through the second optical fiber from the sensor head, the first photodetector being configured to generate:
  a first electrical signal indicating a light intensity of the light having the first wavelength; and
  a second electrical signal indicating a light intensity of the light having the second wavelength;
a second photodetector for receiving light transmitted through the third optical fiber from the sensor head, the second photodetector being configured to generate:
  a third electrical signal indicating a light intensity of the light having the first wavelength; and
  a fourth electrical signal indicating a light intensity of the light having the second wavelength.

16. The optical sensor of claim 15, further comprising:
a processing section for calculating the physical quantity and for detecting the change in the environment condition in the sensor head;
wherein the processing section is configured to calculate the physical quantity based on the first and third electrical signals (generated by the first wavelength);
wherein the processing section is configured to detect the abnormality of the environment condition in the sensor head based on the second and fourth electrical signals (generated by the second wavelength).

17. An optical sensor, comprising:
a sensor head according to claim 1;
a light source for emitting light having a first wavelength and light having a second wavelength;
a plurality of detectors;
a processing section for calculating the physical quantity and for detecting the change in the environment condition in the sensor head;
wherein the processing section is configured to calculate the physical quantity by using only the light having the first wavelength and not the light having the second wavelength;
wherein the processing section is configured to detect the abnormality of environment condition in the sensor head by using only the light having the second wavelength and not the light having the first wavelength.

18. An optical system, comprising:
a sensor head according to claim 1; and
a light source for emitting light having a first wavelength and light having a second wavelength;
wherein in the light-intensity variation section the first optical fiber is divided to have cut surfaces;
wherein the cut surfaces of the first optical fiber are provided so as to face to each other with a certain distance therebetween;
wherein the light-intensity variation section includes a transmitting member provided between the cut surfaces of the first optical fiber;

wherein the optical system is configured to use the light having the second wavelength to detect the abnormality of the environmental condition in the sensor head; and wherein a change in the environmental condition in the sensor head causes the transmitting member to substantially transmit light having the first wavelength and to substantially absorb light having the second wavelength.

\* \* \* \* \*